Sept. 18, 1934.   C. HAHN   1,973,897
COKE OVEN BATTERY
Filed July 22, 1931   2 Sheets-Sheet 1
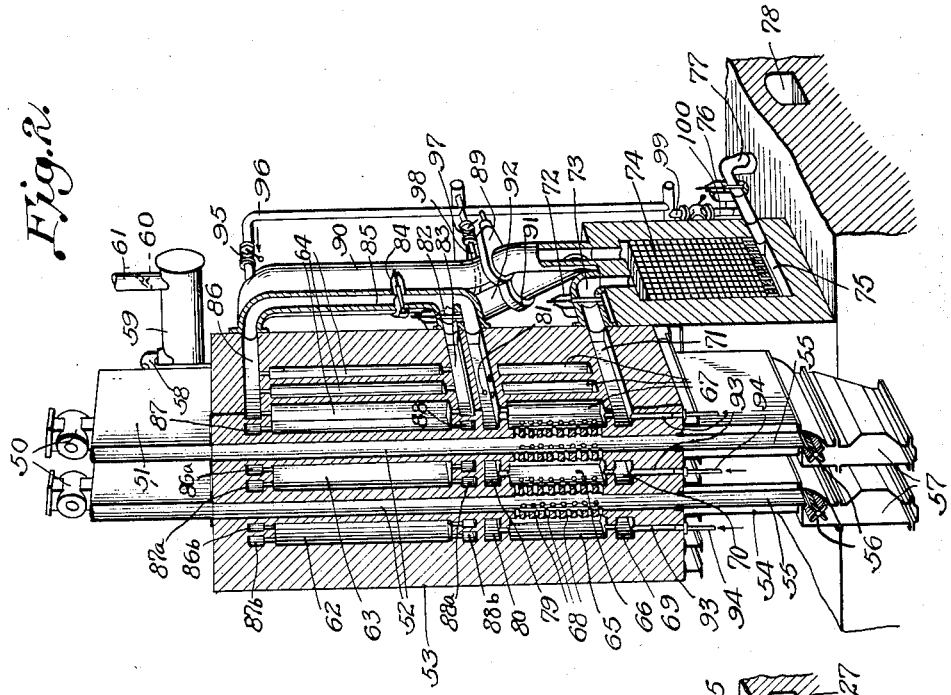
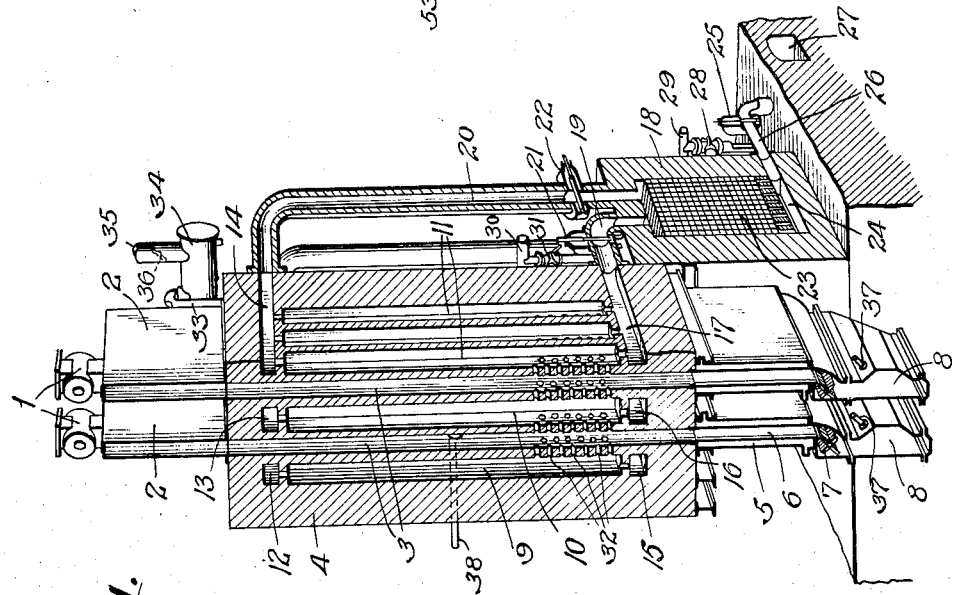
Inventor:
Conrad Hahn
By Henry Love Clarke
Atty.

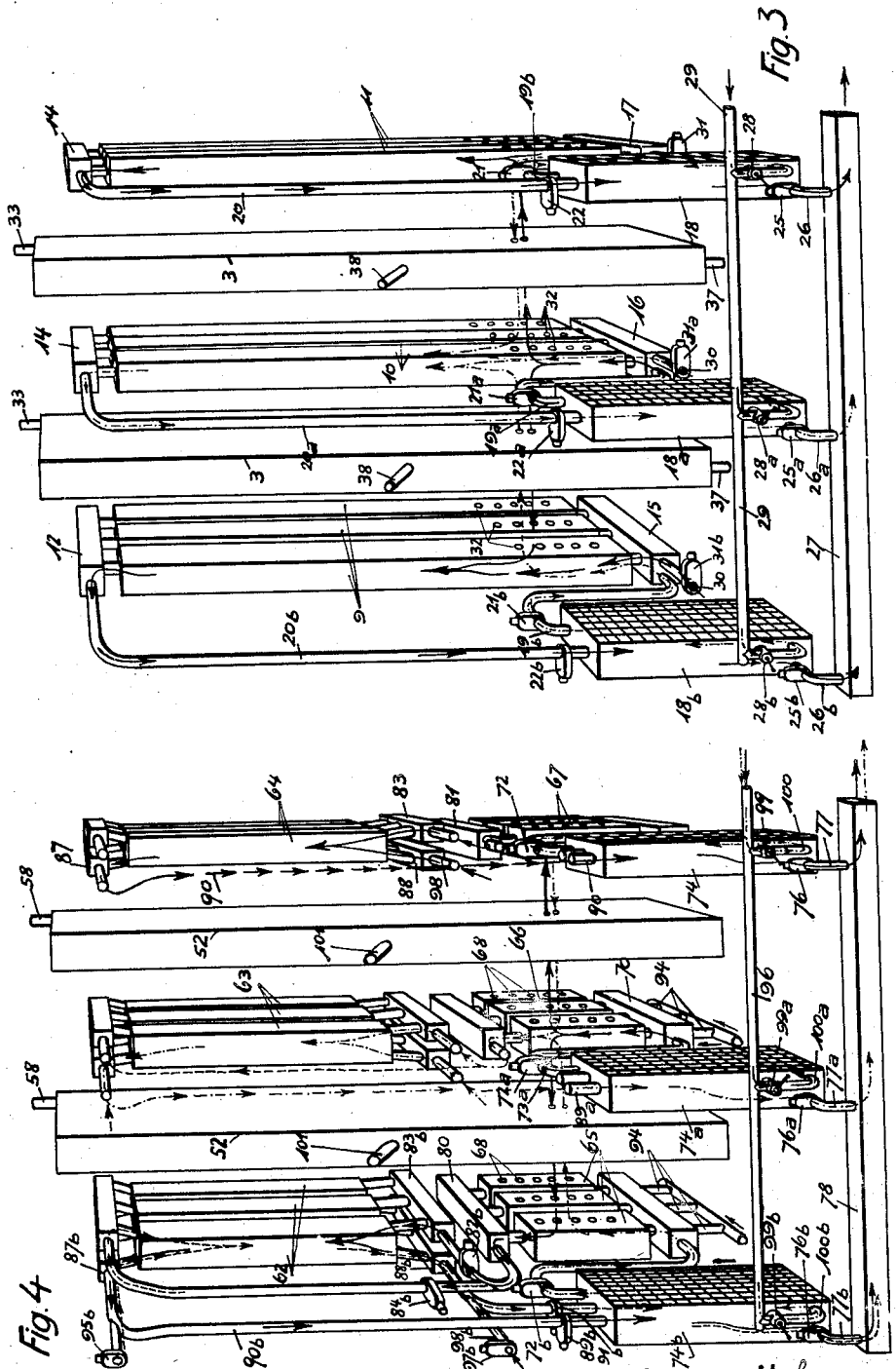

Patented Sept. 18, 1934

1,973,897

UNITED STATES PATENT OFFICE 1,973,897

COKE OVEN BATTERY

Conrad Hahn, Essen-Ruhr, Germany, assignor, by mesne assignments, to The Koppers Company of Delaware, Pittsburgh, Pa., a corporation of Delaware Application July 22, 1931, Serial No. 552,454
In Germany July 23, 1930

2 Claims. (Cl. 202—121)

The invention refers to the production of gas and coke from coal, lignite or the like in such oven batteries where the coal in dry condition is heated up in continuous or intermittently run vertical chambers or retorts for the production of rich gas and whereby the coke resulting for the purpose of complete gasification of the coke and production of lean gas, is treated in the lower part of the retort with air and steam.

The object of the invention is improvements in the said oven battery for the simultaneous production of rich and lean gas, whereby the utilization of the lean gas produced in the lower part of the oven chamber is rendered possible for the heating up of the oven chamber under recovery of the heat out of the waste gases. According to the invention, the opposite walls of the oven chambers are, for this purpose, provided in the lower part of same with openings, which open out either directly or indirectly into the heating flues provided in the chamber walls combustion air being led forward in one of several working periods into the one or more channels in the one heating wall whereas the channel in the opposite heating wall, is connected up during the same working period with a combustion air and steam pipe line and with an apparatus for the recovery of heat and during the other working period the channels are connected up in a contrary direction with the heat recovery apparatus and the steam and air pipe lines. According to the invention moreover, the heating flues serving to heat up the oven chambers, can be alternatively heated up by the flames from below upwards and from above downwards for which purpose the wall channels by means of a by-pass channel are connected up in the one working period with the upper and in another working period with the lower end of the heating flues, whereby, in this case, the heating flues serving for the heating up of the oven chamber are only provided in the upper part of the oven above the chamber wall openings.

For the recovery of the heat from the waste gases either recuperators or regenerators can be made use of in the case of the ovens constructed according to this invention. Preference is, according to this invention, given to the use of regenerators, Should regenerators be utilized for the recovery of the heat from the waste gases, there is provided, according to this invention, at least one regenerator for each row of heating flues and this regenerator is connected up, on the one side, with the suction opening of the heating flues and on the other side, with those channels into which the wall openings provided in the lower part of the chamber, open out, whereby shut-off dampers in the respective connecting pipe lines are arranged in such a way that each regenerator can be connected up in the one working period with the waste gas openings of the heating flues and in the other working period with the vertical channels in the lower end of the chamber wall, and in the other working period with the said parts of the oven in a contrary direction. Moreover, as customary, the regenerators in the one working period are connected up with the flue to the chimney and in the other working period with the air pipe line.

The working of the ovens according to the invention is generally as follows: In the one working period the air preheated in the respective regenerator is conveyed through the said opening in the lower part of the one row of the heating flues horizontally and then through the glowing coke inside the coking chamber to the openings in the opposite chamber wall and from there directly or indirectly the gases are led forward to the burners in the heating flues, where they are burned, whereupon the waste gases resulting are sent forward to one or more regenerators for the purpose of the same taking up the heat. After a certain working period the stream of gases is shut off and now through the wall openings, steam or a mixture of steam and air suitably preheated in the one of the regenerators is blown in, whereby lean gas results which, either together with the rich gas, produced in the upper part of the indirectly heated up oven chambers, is led off from the oven chamber or is drawn off alone in the centre of the oven chamber. As soon as the temperature of the coke sinks below a certain degree, in the lower gasification part of the oven chamber, the dampers provided for in the gas pipe lines of the ovens are regulated in such a way that now the air is sucked through the regenerators which previously were heated up by the hot waste gases and then is carried forward to the openings, in the other row of heating flues and from there through the coke, the gases produced being led to the burners of the one heating flue, which had not been previously heated, and finally after combustion in waste gases are led through the regenerators through which previously the combustion air had passed. As soon as the coke has been brought up again, in the lower gasification part of the oven chamber by the combustion air to the desired temperature, the flow of gas is interrupted in all the heating flues and now steam or a mixture of steam and air is passed again through the lower chamber wall openings. The lean gas thus resulting is drawn off, with the distillation gases or separately from same, from the oven chamber in the manner indicated.

There are numerous possibilities of carrying out the invention. In the attached drawings there is shown for example an oven battery, built according to the invention, fitted up with regenerators for the recovery of heat from the waste gases.

On the drawings there is represented in Figs. 1 and 2 an oven battery according to the invention in vertical section and partly with a side view. Figs. 3 and 4 show diagrammatically the regenerators, channels, flues and pipe lines of the oven battery represented in Figs. 1 and 2, and furthermore the direction of the flow of gas in the oven battery during the various working periods is indicated. In the case of the construction given in Fig. 1 the coal is filled in through a charging shaft 2 provided with a chute contrivance 1 in the upper end of the oven chamber 3 which is arranged in an oven block consisting of fire brickwork 4. In the chambers 3 the coal is heated up indirectly in the upper part of the chambers to such a temperature that it is converted during the production of gas into coke. The coal charge or the coke sinks respectively in the course of the running of the plant, gradually into the lower part of the oven chambers 3 where the coke entirely or partly is gasified by treatment with air and steam. The parts of the coal and the ash which have not been used up are carried forward through the cooling shell 5 provided in the draw-off channel 6 of a delivery contrivance 7 which as customary consists of a row of stars fixed to a revolving shaft. The coke falls down from above continuously to the bunkers 8 out of the draw-off shafts 6. With the bunkers 8 the pipe lines 37 are connected up outside through which steam can be blown into the bunkers 8. This steam penetrates through, during a certain period of working, heated up coke in the chamber, whereby water gas is produced. This water gas can be either drawn off with the distillation gas at the upper end of the chamber or possibly alone through the pipe line 38 opening into the middle of the oven chamber.

For the drawing off of the rich gas resulting during the dry heating up of the coal inside the chamber an ascension pipe 33 is, in the case of the ovens shown, connected up to the upper end of the oven chamber 3, which opens out as customary into the hydraulic main 34 which is connected up with a gas suction pipe line 35 in communication with a suction ventilator not shown in the drawings. At the point of the opening in the gas suction pipe line 35 into the hydraulic main, there is provided for the regulation of the free section of the suction pipe line 35 a throttle flap 36 adjustable from outside.

For the heating up of the oven chamber there are provided in the walls of the oven chamber rows of heating flues 9, 10 and 11. The heating flues of each row are connected up at one end with one another viz. by the heating flues 9, through the upper cross channel 12, the heating flues 10 through the upper cross channel 13, and the heating flues 11 through the upper cross channel 14. In a similar manner the heating flues of each row are connected up with one another at the lower end by the channels 15, 16 and 17.

To the upper channels 12, 13 and 14 pipe lines are connected, lined with refractory materials, which are in communication with the regenerator arranged at the upper end of the oven block on the side adjoining the coking chambers. On the drawings not all the regenerators are shown in section. There is actually shown in section only the regenerator 18 connected up to the row of heating flues 11, the regenerator is connected up with the corresponding channels 14 and 17 by means of the pipe lines 19 and 20 respectively. In the pipe lines 19 and 20 there are inserted gas shut-off dampers 21 and 22 which are preferably to be cooled by water. The regenerator 18 is as customarily filled with chequer works, consisting of refractory material. At the lower end of which there is a sole channel 24 which is connected up with a pipe line 26 fitted with a shut-off contrivance 25 to the flue 27 leading to the chimney, whereby the air pipe line 29 controlled by a cock 28 opens out into the pipe line 26. Moreover, in the connecting pipe line 19 an air line 30 also opens out controlled by a shut-off cock 31.

In a similar manner the regenerator 18, which belongs to the heating flues 11, the regenerators belonging to the heating flues 9 and 10 are connected up with the upper and lower cross channels 12 and 15, 13 and 16 and respectively to the flue 27 leading to the chimney, and the air lines 30 and 29.

At the lower end of each of the heating flues of the three heating flue rows, there are provided a row of wall openings 32 leading to the oven chambers, as maybe seen from the drawings.

The manner of working of the ovens shown in Fig. 1 is to be seen from the Fig. 3. In the Fig. 3 there are only diagrammatically shown the cavities of the oven battery, through which the gases from the coal and coke respectively pass. The respective cavities are indicated with the same figure as the cavities of the oven battery shown in Fig. 1.

First of all by means of the Fig. 3, the path of gases may be described, which takes place when the two outer heating flue rows 9 and 11 are heated up by the flame. In this case, the gas stream in Fig. 3 is indicated by the arrows with a long shaft. As shown, air is introduced into the middle regenerator 18 through the opened valve 28a from the pipe line 29 from below. The air rise in the regenerator up high, is thereby warmed up and then enters through the pipe line 19a and the open valve 21a into the lower cross channel 16. Thereby the damper 22a of the pipe line 20a leading to the upper connection channel 13, is closed.

From the cross channel 16, the gas goes to the underpart of the heating flues 10. As same are closed, at the upper end by the damper 22a, the gases can only escape through the wall openings 32 of the heating flues 10. They enter therefore, from outside of the heating flue 10 in the adjoining oven chambers 3, and stream then horizontally through the hot coke in the chamber, whereby a part of the coke is burned and the entire mass of coke is brought up to the necessary high temperature for the following working period. From the oven chamber the gases escape, through the opposite wall opening 32, into the outer heating flue rows 9 and 11. The lower connecting cross channels 15 and 17 of the outer heating flue rows are connected up by means of the dampers 31 and 31b with the air pipe line 30—in Figure 3 in order to assure more clearness it being not indicated—so that in the lower connecting channels 15 and 17 air is introduced. From the connecting channels 15 and 17 the air introduced reaches the respective heating flues 9 and 11 where it is consumed with the hot gases containing carbon monoxide and water gas streaming through the walls 32. The hot combustion gases rise in the leading heating flues 9 and 11 upwards and enter at the upper end of the heating flues in the upper connecting channels 12 and 14 which are connected up by the pipe lines 20 and 20b, the dampers 22 and 22b are opened with the two outer regenerators 18 and 18b. The pipe lines 19 and 19b which lead from these regenerators to the pertaining lower connecting channels 15 and 17 are during this period of working closed by the damper 21 and 21b. In the regenerators the hot waste gases flowing from above downwards give up to the largest part of the heat to the chequer work of the regenerators. They leave then the regenerators at the lower end, the dampers being open and pass into the pipe line 26 and 26b and finally into the flue leading to the chimney. During this working period the shut-off cocks 28 and 28b in the pipe lines leading to the air pipe line, which likewise are connected up with the lower end of the regenerators, as mentioned above, are closed.

As soon as the coke in the lower part of the oven chambers is heated up to the necessary high temperature for the purpose of producing water gas, the dampers 28a, 21a, 22a and 21, 22, and 21b, 22b and 31, 31a and 31b are closed, so that the heating flues 9, 10 and 11 are closed off absolutely against the outside air and from the regenerator. Steam is now blown through the pipe line 37 into the bunkers 8 from which the steam rises upwards through the glowing coke so that the steam coming into contact with the glowing coke is transformed into water gas. For simplicity's sake, the steam inlet pipe lines 37 in Fig. 3 are shown connected up directly with the oven chambers 3. The supply of steam is continued until the temperature of the coke inside the oven chamber has been lowered to such an extent, that the formation of water gas no longer takes place. The steam pipe line is then shut off and the shut-off dampers 25 and 25b are closed and then, correspondingly one after the other, the dampers 25a, 22a, 28, 28b, 21, 21b, and 31a are opened. The combustion air, the gases for burning and the waste gases now follow the path by the arrows provided with short line shafts through the oven in the contrary direction to that described in the former working period. In this connection the coke in the lower part of the oven chamber by partial burning is brought to a sufficiently high temperature for the production of water gas, whereas the gases containing carbon monoxide and water gas thus resulting are burned in the center heating flues 10 and the regenerator 18a previously cooled down is heated up again. As soon as the coke in the oven chambers has been brought to the desired temperature, the dampers previously open are closed and through the pipe line 37 for a certain time steam is led into the chamber. When the coke has been cooled down again by the formation of water gas in the oven chamber, the gas dampers are again so adjusted as indicated in the working period at first described, and there begins again the heating up of the coke to the necessary temperature for the formation of water gas whilst the chamber wall is simultaneously heated.

In the construction shown in Fig. 2, the coal or lignite to be treated is led forward as in case of the oven shown in Fig. 1 through the chute 50 to the charging shafts 51 of the two oven chambers 52 which are extended completely from above to below through the oven block consisting of refractory brickwork and are connected up with the draw-off shafts 55 provided with the cooling shells 54 which are each provided with a draw-off contrivance 56 through which the material is drawn off continuously into the bunker 57. The distillation gases which result from the dry heating of the coal in the oven chamber are led off at the upper end of the chambers by the ascension pipes 58 which are connected up with the hydraulic main and a gas draw-off pipe line 61 provided with a throttle flap 60 and leading to a gas exhauster not shown.

In each wall of the oven adjoining the oven chambers 52 there are provided rows of vertical flues 62, 63, 64 and flues 65, 66 and 67 lying above one another.

The lower vertical wall flues 65, 66, 67 are connected up by a row of openings 68 with the lower part of the oven chambers 52. Furthermore, the lower channels of each chamber wall are connected up at the lower end with one another by the flues 69, 70 and 71, from which the pipe line 73 controlled by dampers 72 lead each to one regenerator. On the drawings for sake of clearness only the regenerator 74 belonging to the channel 67 is shown. The regenerators are, as customary, filled with refractory brickwork which serves for conveying the heat taken up from the hot gases to the medium to be heated up. At the lower end of the regenerator, sole channels 75 are provided connected up with the pipe line 77 controlled by the dampers 76 which lead forward to the flue going to the chimney.

The lower wall channels 65, 66, 67 of each row of heating flues are connected up with one another at their upper end each by cross channels 79, 80 and 81. Each of these cross channels is by means of pipe lines in communication with the upper and lower end of the respective top heating flues 62, 63, 64. In the drawings the connecting channels are only shown for the cross channel 81, which is connected up with the channel 83, controlled by the dampers 84 with the lower end of the heating flues 64 and by the pipe line 85 which is lined with refractory brickwork and controlled by the damper 84, with the horizontal channel 86 leading to the upper end of the heating flues 64. Furthermore the upper and lower end of the heating flues are in communication with other horizontal channels 87 and 88. From the upper horizontal channel 87 there leads a pipe line 90 controlled by damper 89, to the upper end of the regenerator 74 and from the lower horizontal channel 88 a pipe line 92 controlled by damper 91 goes forward likewise to the upepr end of the regenerator 74. In a similar manner the horizontal channels 88a and 88b, 87a and 87b of the heating flues 62 and 63 are connected up with the corresponding regenerators.

Into the lower horizontal channels 69, 70 and 71 there lead from outside the ovenblock vertical channels 93 to which outside pipe lines 94 are connected up.

To each of the pipe lines leading from the upper horizontal channels 87a and 87b and going forward to the regenerator there is an air pipe line 96 connected up, controlled by the cock 95, the rising pipe lines 98 controlled by the cock 97 being also connected up by the lower horizontal channels 88, 88a and 88b. Furthermore, the air pipe line 96 communicate by means of the pipe line 100 controlled by a valve 99 also with the lower end of the regenerators 74.

The manner of working of the oven shown in Fig. 2 is explained by the Figure 4 in which the cavities of the oven are diagrammatically shown through which the gases and coal respectively pass.

In the description of Fig. 4 may be first mentioned the travel of the gas indicated by the arrow with long drawn shafts. The cock 99a which leads to the middle regenerator 74a is open to the pipe line 100a connected up with the principal air pipe line 96 so that air may stream into the regenerator 74a. The air is heated up in the regenerator 74a and enters at the upper end of the regenerator by the pipe line 73a when the dampers 72a are open. From there the air reaches the lower flues 66 of the middle row of heating flues which it leaves by the openings in the walls 68. The highly heated up air passes now through the coke in the oven chambers 52 where same is partially burned and the remaining coke is brought to a sufficiently high temperature for the production of water gas. The carbon monoxide and the water gas contained in the gases which result from the partial burning of the coal leave the oven chambers through the openings 68 provided for in the opposite chamber wall and enter then the vertical flues 65 and 67 of the two outer rows of heating flues of the oven. As indicated by the arrows, the gases leave above the lower vertical flues 65 and 67 and enter the upper combustion channels 80 and 81 from which they stream into the lower horizontal channels 83 and 83b of the upper heating flues 62 and 64 when the dampers 82 and 82b from which for sake of clearness the damper 82 is not shown in Fig. 4, are open. From the channels 83 and 83b the gases proceed now to the lower end of the heating flues 62 and 64 where they are consumed together with air, which is passed into the heating flues by the horizontal channels 88 and 88b which are connected up when the dampers 97b (and the damper 97 which is not shown) are opened through the pipe line 98 and 98b, with the main air pipe line 96, not shown in the Figure 4.

The hot waste gases rise upwards in the heating flues and leave same at the upper end by the channels 87 and 87b which are in connection with the upper end of the outer regenerators 74 and 74b when the dampers 89 and 89b are opened. The hot gases now stream through the regenerators 74 and 74b, thus heating up the chequer work of the regenerators and finally leave through the pipe lines 77 and 77b, connected up with regenerator sole channel when the dampers 76 and 76b are opened.

As soon as the coke in the oven chambers by self-burning has reached the necessary temperature for the production of gas, the dampers 99a, 72a, 82, 82b, 84, 84b, 89, 89b, 76, 76b, 97 and 97b are closed. Now, steam is blown through all the pipe line 94 into the lower channels 65, 66, 67, from where the water gas passes over through the wall openings 68 in the coke which has previously been heated up. In this way water gas is formed which is thrown off alone through the pipe line 101 in the middle of the oven chambers or together with the distillation gas at the upper end of the chamber to the ascension pipe 58.

When the coke has been cooled down to a temperature at which no more water gas is produced, the dampers 76a, 89a, 82a, 97a, 72 and 72b, 99 and 99b are opened. By means of this adjustment of dampers the air passes first of all to the two outer regenerators, streams then through the coke in the oven chamber and arrives afterwards in the lower heating flue row and burns in the upper heating flue of the middle row upwards. The hot waste gases are finally drawn off from the upper end of the heating flues through the middle regenerator. This period of working is continued so long, that the coke in the oven chamber is brought again to the desired temperature. Then all the dampers of the oven are again closed and during a certain period steam is led through the coke. After the end of the water gas period, the dampers are so adjusted that the upper heating flues of the chamber walls are heated up by the flame above. For this purpose there are opened the following dampers: 99a, 72a, 84, 84b, 95 and 95b, 91 and 91b, 76 and 76b. In this way the combustion air in the middle regenerator is preheated and, after passing over the glowing layers of coke and heating up of the same, is led through the wall channels 65, 67 of the two outer heating flue rows to the upper end of the upper heating flues 62 and 64, where it meets the air and burns in the heating flues 62 and 64, from above downwards. The hot waste gases are drawn off at the lower end of the heating flues 62 and 64 and are then passed through the two outer regenerators.

This working period lasts, like the previous one, so long that the coke has been blown hot. All dampers are then again closed, steam is passed through the coke and thereupon the dampers 99, 99b, 72, 72b, 84a, 95a, 91a and 76a are opened. Through this adjustment of the dampers the air is preheated in the outer regenerator and the middle heating flues 63 are heated by flames from above downwards.

In the case of the two oven constructions shown on the drawings there is, as already mentioned, provided in the suction pipe line of the hydraulic main a throttle flap for the regulation of the free section of the suction pipe line. This throttle flap is preferably somewhat closed whilst the coke is being blown into a glowing heat in order to avoid that a considerable part of the lean gas resulting from the blowing of the coke is drawn out of the chamber into the hydraulic main which, as already mentioned above, has to serve during this working period for the heating up of the chamber walls. The throttle flap is opened to the full in this case during the water gas period in order that the largest possible quantity of the water gas produced in the upper part of the chamber is drawn off together with the distillation gases.

The oven according to this invention can of course be equally well used for the production of producer gas as for the production of water gas. In this case it is only necessary instead of blowing in steam to introduce a mixture of steam and air into the hot coke. The introduction of the mixture of steam and air is effected in the same way as the introduction of steam for the purpose of making only water gas and the working of the oven, as regards adjustment of the gas cocks and dampers, is the same as in the case of the water gas production.

In the case of the construction shown on the drawings the oven chambers are made entirely of refractory brickwork. It is however possible, without effecting the spirit of the invention, to make the chamber walls of the part of the oven chamber which serves for the production of water gas so that same consists of a metal water jacket through which a liquid flows. In such a case the advantages offered that one part of the heat which is set free by the production of water gas, can be utilized for instance for the production of steam.

The invention as hereinabove set forth is embodied in a particular form of construction, but may be variously embodied within the scope of the claims hereinafter made.

I claim:

1. A coke oven battery comprising a series of alternate vertical cooking chambers and heating walls therefor arranged side-by-side in a row, means for introducing coal at the upper end of the coking chambers and means for drawing off residuals from the lower end of the coking chambers, vertical heating flues in the upper part of the heating walls, vertical channels in the lower part of said heating walls, said channels being communicably connected with the heating flues above said channels, openings in the heating walls connecting the chambers with the channels in the lower part of said heating walls, said heating flues also being communicably connected with a channel for leading waste gas to a chimney, said channels in the lower part of the heating walls being connected with air and steam lines, means for closing said air and steam lines and the channel leading to the chimney, means for drawing off from the oven chambers the gases produced therein, and regenerators for the recovery of the heat from the waste gases, said regenators being communicably connected with the heating flues and with the lower heating wall channels, the channel leading to a chimney and a gas inlet pipe, means for closing the channels leading to the heating flues, to the lower heating wall channels, to the chimney and to the air line.

2. A coke oven battery comprising a series of alternate vertical coking chambers and heating walls therefor arranged side-by-side in a row, means for introducing coal at the upper end of the coking chambers and means for drawing off residuals from the lower end of the coking chambers, vertical heating flues in the upper part of the heating walls, vertical channels in the lower part of said heating walls, said channels being communicably connected with the upper and lower ends of the heating flues above said channels, openings in the heating walls connecting the chambers with the channels in the lower part of said heating walls, said heating flues also being communicably connected at the upper and lower ends of the heating flues with a channel for leading waste gas to a chimney, said channels in the lower part of the heating walls being communicably connected with the air and steam lines, means for closing said air and steam lines and the channel leading to the chimney, means for drawing off from the oven chambers the gases produced therein, means for closing the connections of the lower heating wall channels to the upper and lower ends of the heating flues.

CONRAD HAHN.